United States Patent
Dhoolia et al.

(10) Patent No.: US 10,831,799 B2
(45) Date of Patent: Nov. 10, 2020

(54) EXTERNAL ACTION EXECUTION WITH CONVERSATIONAL AGENT

(71) Applicant: International Business Machines Corporation, Armonk, NY (US)

(72) Inventors: Pankaj Dhoolia, Ghaziabad (IN); Sampath Dechu, Hyderabad (IN); Dinesh Raghu, New Delhi (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 147 days.

(21) Appl. No.: 16/210,644

(22) Filed: Dec. 5, 2018

(65) Prior Publication Data

US 2020/0183961 A1    Jun. 11, 2020

(51) Int. Cl.
*G06F 16/332* (2019.01)
*G10L 15/22* (2006.01)
*G10L 15/01* (2013.01)
*G10L 15/18* (2013.01)

(52) U.S. Cl.
CPC .......... *G06F 16/3329* (2019.01); *G10L 15/01* (2013.01); *G10L 15/1822* (2013.01); *G10L 15/22* (2013.01); *G10L 2015/223* (2013.01); *G10L 2015/225* (2013.01)

(58) Field of Classification Search
USPC .......................... 704/7–9, 200, 257
See application file for complete search history.

(56) References Cited

U.S. PATENT DOCUMENTS

| 8,374,859 | B2 | 2/2013 | Huang et al. |
| 2017/0330077 | A1 | 11/2017 | Williams et al. |
| 2018/0053119 | A1 | 2/2018 | Zeng et al. |
| 2018/0131645 | A1 | 5/2018 | Magliozzi et al. |

*Primary Examiner* — Leonard Saint Cyr
(74) *Attorney, Agent, or Firm* — Ference & Associates LLC

(57) ABSTRACT

One embodiment provides a method, including: receiving an input from a first user requesting information; generating a conversation model from a dialog that occurs between the user and a human agent; recording the human agent performing an external action required to respond to the input; mapping steps performed during performance of the external action to conversation slots within the dialog; generating an integrated interpretable conversation model comprising a dialog and action script; receiving, at a conversational agent system, a subsequent input from a second user requesting similar information to the information requested by the first user; and providing, by the conversational agent system, a response to the subsequent input, wherein the providing a response comprises the conversational agent system utilizing the integrated interpretable conversational model to replay (i) the dialog and (ii) the action script using the subsequent input.

20 Claims, 3 Drawing Sheets

EXTERNAL ACTION EXECUTION WITH CONVERSATIONAL AGENT

BACKGROUND

When a user has a problem or question the user may interact with a conversational agent, for example, chatbot, digital assistant, virtual assistant, or the like. Chatbots generally capture text-based input, for example, a user may access a conversational window and provide text input to the window. The chatbot then processes the input and provides a responsive output, usually as a text-based output. Digital or virtual assistants may include assistants that receive voice input, process the voice input, and then provide a responsive output, for example, by audio, by performing a function, or the like. Conversational agents provide a method for a user to receive assistance with a problem or query that does not require a human user. The conversational agents are programmed to process input and provide output responsive to the input in a manner similar to how another human would engage in the conversation.

BRIEF SUMMARY

In summary, one aspect of the invention provides a method, comprising: receiving an input from a first user requesting information, wherein a response to the input requires performance of an action external to a dialog window; generating a conversation model from a dialog that occurs between the user and a human agent while the human agent is responding to the input; recording actions of the human agent performing the external action required to respond to the input; mapping steps performed during performance of the external action to conversation slots within the dialog, wherein the mapping comprises (i) identifying information requested by the human agent during the dialog and (ii) determining an input step within the external action where the information is provided; generating, from (i) the conversational model, (ii) recorded external action, and (iii) mapped steps, an integrated interpretable conversation model comprising a dialog and action script; receiving, at a conversational agent system, a subsequent input from a second user requesting similar information to the information requested by the first user; and providing, by the conversational agent system, a response to the subsequent input, wherein the providing a response comprises the conversational agent system utilizing the integrated interpretable conversational model to replay (i) the dialog and (ii) the action script using the subsequent input.

Another aspect of the invention provides an apparatus, comprising: at least one processor; and a computer readable storage medium having computer readable program code embodied therewith and executable by the at least one processor, the computer readable program code comprising: computer readable program code configured to receive an input from a first user requesting information, wherein a response to the input requires performance of an action external to a dialog window; computer readable program code configured to generate a conversation model from a dialog that occurs between the user and a human agent while the human agent is responding to the input; computer readable program code configured to record actions of the human agent performing the external action required to respond to the input; computer readable program code configured to map steps performed during performance of the external action to conversation slots within the dialog, wherein the mapping comprises (i) identifying information requested by the human agent during the dialog and (ii) determining an input step within the external action where the information is provided; computer readable program code configured to generate, from (i) the conversational model, (ii) recorded external action, and (iii) mapped steps, an integrated interpretable conversation model comprising a dialog and action script; computer readable program code configured to receive, at a conversational agent system, a subsequent input from a second user requesting similar information to the information requested by the first user; and computer readable program code configured to provide, by the conversational agent system, a response to the subsequent input, wherein the providing a response comprises the conversational agent system utilizing the integrated interpretable conversational model to replay (i) the dialog and (ii) the action script using the subsequent input.

An additional aspect of the invention provides a computer program product, comprising: a computer readable storage medium having computer readable program code embodied therewith, the computer readable program code executable by a processor and comprising: computer readable program code configured to receive an input from a first user requesting information, wherein a response to the input requires performance of an action external to a dialog window; computer readable program code configured to generate a conversation model from a dialog that occurs between the user and a human agent while the human agent is responding to the input; computer readable program code configured to record actions of the human agent performing the external action required to respond to the input; computer readable program code configured to map steps performed during performance of the external action to conversation slots within the dialog, wherein the mapping comprises (i) identifying information requested by the human agent during the dialog and (ii) determining an input step within the external action where the information is provided; computer readable program code configured to generate, from (i) the conversational model, (ii) recorded external action, and (iii) mapped steps, an integrated interpretable conversation model comprising a dialog and action script; computer readable program code configured to receive, at a conversational agent system, a subsequent input from a second user requesting similar information to the information requested by the first user; and computer readable program code configured to provide, by the conversational agent system, a response to the subsequent input, wherein the providing a response comprises the conversational agent system utilizing the integrated interpretable conversational model to replay (i) the dialog and (ii) the action script using the subsequent input.

A further aspect of the invention provides a method, comprising: receiving, at a conversational agent system, an input from a user requesting information, wherein a response to the input requires performance of an action external to a dialog window of the conversational agent system; identifying, at the conversational agent system, a response to the input, wherein the identifying comprises: identifying, from a plurality of conversation logs, a conversation model that corresponds to the input, wherein the conversation model comprises a previously recorded dialog that corresponds to a similar previously provided input requesting the information; the conversation model identifying an external action performed by an agent during provision of a response to the input, wherein the external action is recorded in a script; the conversation model comprising mappings of inputs provided during the previously recorded dialog and a step within the script where each input is provided during performance of the external action; and returning a response to the input by (i) replaying the identified conversation model using the input and dialog inputs provided by the user during a replay of the identified conversation model and (ii) replaying the script corresponding to the conversation model to perform the external action using the input and dialog input; and providing, from the conversational agent system, the response to the user.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

Figure 1:
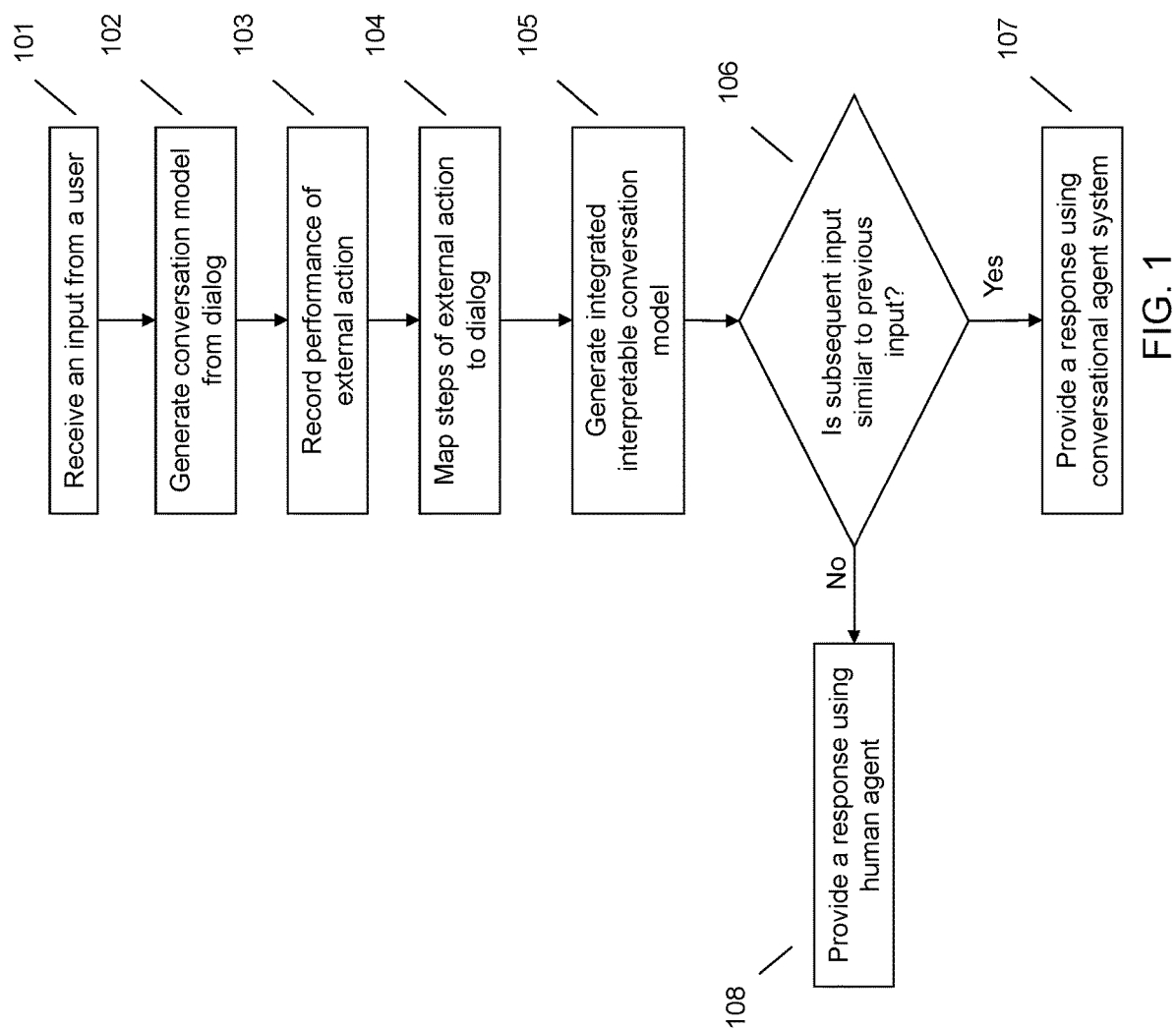
FIG. 1 illustrates a method of training a conversational agent to respond to inputs that require execution of an external action using an integrated interpretable model.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The illustrated embodiments of the invention will be best understood by reference to the figures. The following description is intended only by way of example and simply illustrates certain selected exemplary embodiments of the invention as claimed herein. It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will be made here below to FIGS. 1-3. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 3. In accordance with an example embodiment, most if not all of the process steps, components and outputs discussed with respect to FIGS. 1-2 can be performed or utilized by way of a processing unit or units and system memory such as those indicated, respectively, at 16' and 28' in FIG. 3, whether on a server computer, a client computer, a node computer in a distributed network, or any combination thereof.

The artificial intelligence that conversational agents use has become better allowing the conversation to become more accurate and closer to a conversation with another person. For example, the natural language generation and understanding has improved so that the conversational agent system can more accurately identify the user request and provide a more accurate response or result. Additionally, using data analytics and collaborative filtering has also made the conversation system more accurate and more human-like.

Conventional conversational agents have become very good at responding to requests or inputs that are dialog-based. Specifically, the conversational agents include a dialog model that allows the conversational agent to respond to user requests or inputs. The dialog model is learned by the conversational agent from conversation logs. The conversational agent can then use these conversation logs to identify what responses are to be provided when presented with an input from a user. However, the conventional conversational agent is unable to learn actions. In other words, if a user input requires the conversational agent to perform an action, specifically an action that is external to the dialog window of the conversational agent, the conversational agent is unable to perform this action. Typically, if the user input requires an action, the conversational agent has to feed this input to a human agent who performs the action and then provides input back to the conversational agent to provide back to the user. While some conversational agents can perform some actions (e.g., submitting an order, submitting a repair ticket, etc.), these conversational agents are specifically designed by experts to perform these actions and the conversational agent cannot learn any new actions, unless specifically programmed by a programmer, and cannot fix any issues that are encountered during performance of these actions.

Accordingly, an embodiment provides a system and method for training a conversational agent to respond to inputs that require execution of an external action using an integrated interpretable model. The conversational agent system first enters a training or learning mode. During this learning mode the system records actions performed by a human agent. The human agent receives an input from a user requesting information. This input requires performance of an action external to a dialog window. For example, the user may access a conversation window that allows for text-based communication with a customer service agent or other human agent. During the course of this text-based communication, the human agent may have to access a system, application, or window external to the dialog window in order to provide a response to the user.

From the dialog that occurs between the user and the human agent, the system generates a conversation model that represents the inputs provided by both the user and the human agent. Additionally, while the human agent performs the external action, the system records the human agent. The system then maps steps that were performed during the external action to conversation slots within the dialog. The conversation slots are those dialog points that are identified as the human agent requesting information from the user that is required to perform the external action. Thus, the mapping includes identifying information requested by the human agent during the dialog and determining a step, for example, an input step, within the external action where the information was provided. From the conversation model, the recorded external action, and the mapped steps, the system can generate an integrated interpretable conversation model that includes both a dialog and an action script.

The integrated interpretable conversation model can be used by a conversational agent system when the conversational agent system receives a new input from a new user that is similar to the input that was provided when generating the integrated interpretable conversation model. In other words, the system can identify similarities between an input provided by a user and an input that was provided that resulted in generation of an integrated model. The system can then access the appropriate integrated model and use this model to respond to the input of the user. Responding to the input includes the conversational agent system replaying the dialog and the action script using the input provided during this new conversation. In other words, since the integrated model identifies what input is provided within what step of the action script, the conversational agent can request that input and then perform the steps of the action script in order to return a response to the user.

Such a system provides a technical improvement over conventional conversational agent systems by providing a conversational agent system that can respond to user inputs even if the response requires execution of actions that are external to a dialog window of the conversational agent. In other words, the described system and method provides a conversational agent that can perform actions external to the dialog window, which is not possible with conventional conversational agents. Specifically, the described conversational agent system can learn how to perform actions by using recordings of human agents performing similar actions. In other words, much like conventional conversational agents can learn dialog from conversational logs, the described conversational agent can learn actions from action logs. Additionally, the described conversational agent is able to repair errors that are encountered during execution of the dialog and/or external action, which is not possible with conventional conversational agents.

FIG. 1 illustrates a method for training a conversational agent to respond to inputs that require execution of an external action using an integrated interpretable model. The conversational agent system includes a learning or training mode where the conversational agent can learn how to respond to user inputs. Specifically, in this training mode the system records dialog and actions performed by a human agent when responding to a request. The conversational agent system can then use this information to respond to similar requests without the assistance of a human agent. Thus, during the training mode, at 101, the system receives an input from a user. The input may be a request for information from the system. The input may include any form of request, for example, a question, a statement, a command, or the like. Additionally, the input may have a response that requires the performance of an action external to the dialog window where the request was provided. For example, the user may provide a request to look up the status of a payment or order. Determining this status may require accessing a payment system or an order system, either of which are applications or systems outside the dialog window of the conversation system.

The user may provide the input using a user device, for example, a laptop, smart phone, tablet, digital assistant device, or any other information handling device. Accordingly, the input request may be provided in different formats, for example, as an audio input, text-based input, video-based input, or the like. Depending on the system the input may be converted to a different format. For example, the system may require text-based input. Therefore, the system may include functionality that can convert audio, video, or other non-text-based inputs into a text-based input, for example, natural language processing, speech-to-text processing, and the like.

At 102 the system may generate a conversation model from a dialog that occurs between the user and the human agent while the human agent is responding to the input. In other words, while the human agent converses with the user to obtain information needed to perform the request, the system may record the dialog and generate a conversation model from the dialog. Generating the conversation model may include identifying an intent of the conversation or dialog. This intent may correspond to the desired response or request of the user. Using the example of the user requesting the status of the payment, the intent may be identified as determining the status of a payment. The system may turn the intent into a condition, so that upon subsequent user inputs or requests, the system can determine if the request meets the condition. In other words, upon subsequent requests, the system can determine if the request meets the condition so it can determine what conversation model to access, as discussed in more detail herein.

The conversation model may include conversation slots. These slots identify portions of the dialog where the agent has requested an input from the user. This input is an input that is necessary for providing a response to the request. Using the payment example, the agent may request the user to provide an account number and a telephone number that is on file for the user. These requests by the agent and subsequent responses provided by the user may be identified as conversation slots. Thus, the conversation model identifies these conversation slots, including the prompts that were provided by the agent in order to obtain the necessary information.

At 103 the system may record the human agent performing the external action that is required to respond to the input or request of the user. When the agent minimizes the dialog window, or otherwise makes the dialog window an "inactive" window, the system may start a recording of the actions being taken by the agent. An inactive window includes a window, screen, or application that is not the currently active window or window currently receiving input, even if the window is still visible on the display screen. As the agent performs whatever actions are required for processing the request and obtaining the desired information, the system makes note or records these activities. These activities may include an agent opening a new window, opening an application, providing input (e.g., clicking an icon, providing keyboard input, providing touchscreen input, etc.), or the like. From these recorded activities, the system may generate a script that identifies what actions were performed. This script may be both human readable and machine executable, meaning it is understandable by a human and also executable by a machine.

At 104 the system may map steps that were performed during performance or execution of the external action to conversation slots within the dialog. In other words, the input identified in the conversation slots as being necessary for the performance of the external action is mapped to the step where that input was provided within the external action. Using the payment example, the conversational slot that identified the user account number is mapped to the step in the external action where the user account number was provided. Similarly, the conversational slot that identified the user phone number is mapped to the step in the external action where the user phone number was provided. Thus, the mapping includes identifying the information requested by the agent during the dialog and determining the step within the external action that the information was provided.

The system then generates an integrated interpretable conversation model at 105. An integrated interpretable conversation model is a conversation model that includes both the dialog and the actions performed during the external action and is able to be executed by a machine. The integrated interpretable conversation model is generated from the conversational model, the recorded external action, and the mapped steps and includes a dialog and action script. The dialog is identified from the conversational model and the action script is identified from the external action recorded. However, in order to use the dialog and action scripts during a later or subsequent user request, the system may first parameterize the inputs and external actions based upon the mapping performed at 104. In other words, if the dialog and the action script include exactly what was performed during this training session, the conversational agent system would not be able to correctly respond to the user unless the values were exactly the same as was recorded during the training session. Thus, the system instead illustrates the conversational slot input and corresponding external action step as parameters or variables, so that the conversational agent can manipulate these variables based upon the inputs received during the subsequent requests. Thus, the action script and the dialog may include these parameters or indication of these parameters so that the conversational agent knows what to request or prompt the user for and where to use the information provided in response to the request.

Figure 2:
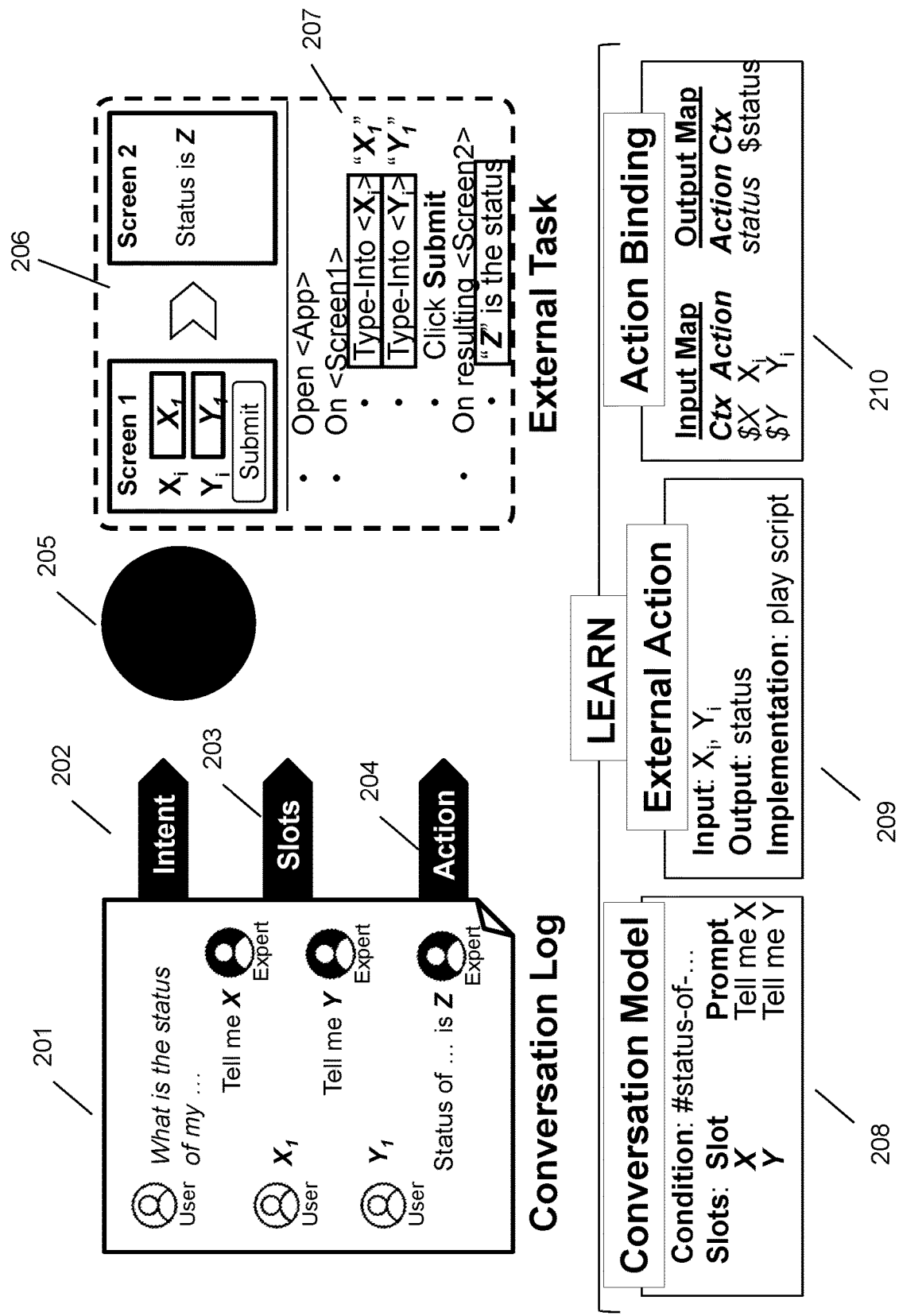
FIG. 2 illustrates an example of generation of an integrated interpretable model.

FIG. 2 illustrates an example system for generating the integrated interpretable conversation model. In other words, FIG. 2 illustrates an example training system or mode of the system. The dialog 201 of the conversation between the agent and the user is recorded. During this conversation the agent may request additional information from the user, for example, information necessary for fulfilling the request. In this example, these prompts are identified as X and Y, and the responses are identified as $X_1$ and $Y_1$. From the conversation, the system can identify the intent 202 and the conversation slots 203. As stated above, the conversation slots are those conversation or dialog turns that request or result in learning the information necessary for performing the external action. The agent then identifies what action needs to be performed and starts performing that action 204. Once the agent starts performing the action, the external task recording is started 205. As the agent performs the necessary actions 206 to perform the external task, the system records the steps into a script 207. The system also identifies what output provided by the external task is used to provide the response to the request to the user, identified as Z in this example.

From the recorded dialog and recorded external task or action the system learns and generates an integrated model. From the dialog the system learns the conversation model 208. The conversation model identifies the condition, which is identified from the intent, and the conversational slots, including the response provided by the user and the prompt provided by the agent to get the response. From the external action recording, the system learns the external actions 209. For example, the system learns what input is necessary, what output is provided, and how to use the input to get the desired output. From both the dialog and the external action recording the system learns the mapping or action binding 210 of dialog inputs or responses to external action steps. In this example, the system identifies that a user provided response of $X_1$ maps to the external action step requesting $X_1$, $Y_1$ maps to $Y_1$, and Z maps to the status. The system then generates the integrated model from the conversation model 208, external action 209, and action binding 210.

Out of training mode the system may determine whether subsequent input is similar to previous input at 106. In other words, the conversational agent system may receive a subsequent input or request from a second user. This request may request information that is similar to the information requested by the first user, or the user that was used to generate the integrated model. Using the payment example, the subsequent user may request a payment status, which is a similar request that was made by the first user. To determine if the subsequent request is similar, the system may identify whether the request meets the condition of the integrated model. In other words, the system determines if the intent of the subsequent request is the same as the intent of the first request. Although only the first request is discussed herein, it should be understood that the training mode may result in many different integrated models each having a different intent or condition. Thus, the system may identify which of these many different integrated models has the same intent and use that integrated model for responding to the subsequent request. Thus, the first request may be any of the requests that were used to make any of the integrated models.

If the subsequent input is different than the first input or request at 106, the system may provide a response using a human agent at 108. This response may also be recorded to create an integrated model as discussed above. If, however, the subsequent input is the same or similar to the first input or request at 106, the conversational agent system may provide a response to the subsequent input at 107. In other words, instead of using a human agent, the system may use a conversational agent capable of responding to the request without human intervention.

To provide a response the system may access or select the correct integrated model that corresponds to or most closely resembles the subsequent input or request. The conversational agent system may then replay the dialog and the action script of the integrated model using the subsequent input and request. Replaying the dialog and the action script may include prompting the user providing the subsequent input for the information that is necessary for performing the external action as identified in the dialog. The system may then use the provided information to perform the external action per the action script. Upon receiving the desired information from the external action, the system may then provide the response to the user. In replaying the dialog and the external action, the system dynamically changes the parameters of the dialog and the action script to match the information provided during the dialog. In other words, the system prompts the user for X information and then provides this value to the external action so that an output can be provided by the external action.

During provision of the response, the conversational agent may encounter errors in providing the response. In other words, even though the conversational agent is using the integrated model, the dialog and/or external action may not occur exactly like the integrated model illustrates. As an example, the user may provide incorrect information which may result in an error by the external action, specifically that using the input provided in the external action cannot provide an output. In this case the conversational agent can automatically repair the integrated model during the dialog. In this example the system can determine what external action step resulted in the error and which dialog input corresponds to this external action step. The system can then request that the user provide a corrected input based upon what dialog input was determined to be the cause of the error. As an example, if the user provides an incorrect account number, the system may determine that the external action failed at the step that required the account number. Thus, the system can request that the user confirm the account number. Using this new information, the system can rerun the external action and get a result.

As another example, while executing the integrated model, the system may determine that an error was made in an assumption made by the system, thereby resulting in the inability to provide an output. In this case, the system can adjust a mapping between a dialog input and an external action step. In other words, the system may recommend that a new conversational slot related to the mapping be provided in order to account for the incorrect assumption. Additionally or alternatively, the system can request a new value from the user and use this new value to override the old value.

As an example, a user may request a status of a policy and provide the name of the user and the policy number. However, when performing the external action, the system determines that there is an error in providing the output. Thus, the system may request the user to correct the input. In response to this prompt, the user may identify that he/she is requesting a policy status on behalf of another user. Thus, the assumption made by the system that the user name corresponds to the policy number is incorrect. Accordingly, the system may adjust the mapping between the original user name and the newly provided user name which corresponds to the actual policy holder, thereby repairing the integrated model.

As another example, the system may encounter an ambiguity while executing the integrated model. To resolve this ambiguity, and, thereby repair the integrated model, the system may try a first input population into the external action. In the case that this input population fails, the system may attempt an alternate input population. In other words, the system may provide a first order of inputs to the external action. If that fails, the system may change the order to another order and try this order of inputs in the external action. Changing the input order may continue until an output is returned by the external action, thereby repairing the integrated model.

As an example, a user may provide multiple inputs in response to a single response, for example, the user may provide a user name and phone number in response to an identification prompt. Thus, the system may be confronted with the ambiguity of whether the user name or the phone number goes into an input slot within the external action. Thus, the system may try the user name and then the phone number. If that does not work, the system may then try the phone number and then the user name. Thus, even if the system receives an input error, has an incorrect assumption, or is confronted with an ambiguity, the system is able to automatically repair the integrated model and still provide a response to the user without requiring human intervention.

Thus, the described conversational agent system represents a significant technical improvement over conventional conversational agents in that it provides a conversational agent that can not only learn dialog and conversational states, as with conventional conversational agents, but it can also learn actions and how to perform the actions. Additionally, the described system can resolve issues that occur during the dialog and performance of the actions, thereby repairing the conversation, which is a not possible using a conventional conversational agent. Thus, the described system and methods are more efficient and effective than traditional conversational agents. Additionally, the described conversational agent is more flexible than the traditional systems in that it can respond to more requests than the traditional systems, specifically requests that require the performance of an action external to the dialog system.

Figure 3:
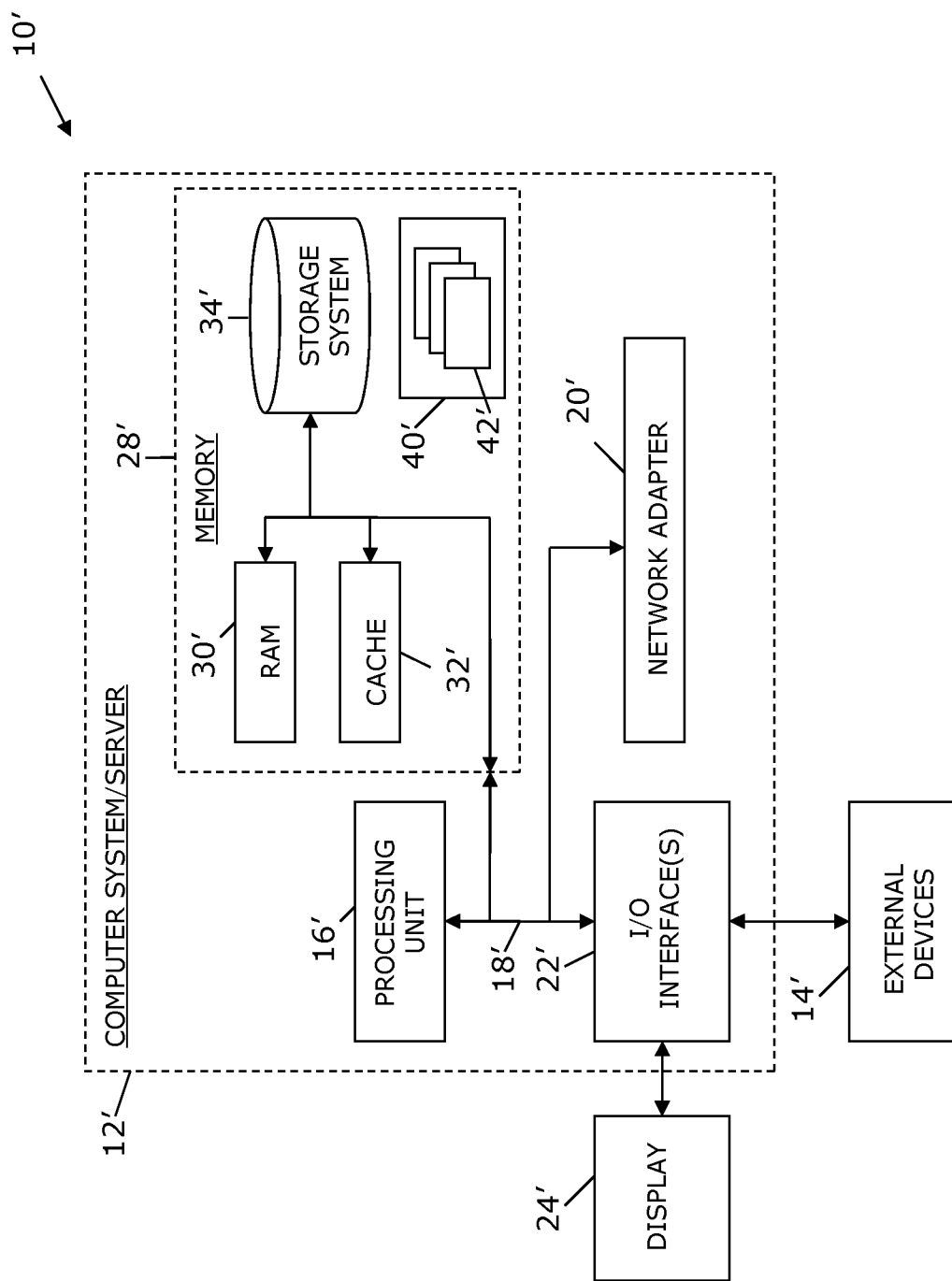
FIG. 3 illustrates a computer system.

As shown in FIG. 3, computer system/server 12' in computing node 10' is shown in the form of a general-purpose computing device. The components of computer system/server 12' may include, but are not limited to, at least one processor or processing unit 16', a system memory 28', and a bus 18' that couples various system components including system memory 28' to processor 16'. Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD- ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12'; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method, comprising:
   receiving an input from a first user requesting information, wherein a response to the input requires performance of an action external to a dialog window;
   generating a conversation model from a dialog that occurs between the user and a human agent while the human agent is responding to the input;
   recording actions of the human agent performing the external action required to respond to the input;
   mapping steps performed during performance of the external action to conversation slots within the dialog, wherein the mapping comprises (i) identifying information requested by the human agent during the dialog and (ii) determining an input step within the external action where the information is provided;
   generating, from (i) the conversational model, (ii) recorded external action, and (iii) mapped steps, an integrated interpretable conversation model comprising a dialog and action script;
   receiving, at a conversational agent system, a subsequent input from a second user requesting similar information to the information requested by the first user; and
   providing, by the conversational agent system, a response to the subsequent input, wherein the providing a response comprises the conversational agent system utilizing the integrated interpretable conversational model to replay (i) the dialog and (ii) the action script using the subsequent input.

2. The method of claim 1, wherein the generating a conversation model comprises identifying an intent of the dialog; and
   wherein the receiving a subsequent input comprises identifying that the subsequent input has the same intent as the identified intent of the dialog.

3. The method of claim 1, wherein the providing a response comprises the conversational agent system prompting the second user based upon the conversation slots of the dialog.

4. The method of claim 1, comprising parameterizing the recorded external action based upon inputs provided during the external action to generate the action script.

5. The method of claim 4, wherein the replaying the action script comprises dynamically changing the parameters using inputs provided during the subsequent dialog.

6. The method of claim 1, comprising repairing the integrated interpretable conversational model during a dialog corresponding to the subsequent input after identifying an input error while executing the integrated interpretable conversational model; and
   wherein the repairing comprises (i) determining an external action step resulting in the error and a dialog input corresponding to the external action step and (ii) requesting the second user provide a corrected input based upon the determined dialog input.

7. The method of claim 1, comprising repairing the integrated interpretable conversational model during a dialog corresponding to the subsequent input after identifying an assumption error while executing the integrated interpretable conversational model; and
   wherein the repairing comprises adjusting a mapping between a dialog input and a step of the external action.

8. The method of claim 1, comprising repairing the integrated interpretable conversational model during a dialog corresponding to the subsequent input after identifying an ambiguity in input provided by the second user during the dialog; and
   wherein the repairing comprises executing steps of the external action using alternative inputs of the dialog, wherein the alternative inputs of the dialog are based upon the ambiguity.

9. The method of claim 1, wherein the recording comprises recording at least one action selected from the group consisting of: an opened application, an opened window, and a provided input.

10. The method of claim 1, wherein the action script is human readable and machine executable.

11. An apparatus, comprising:
    at least one processor; and
    a non-transitory computer readable storage medium having computer readable program code embodied therewith and executable by the at least one processor, the computer readable program code comprising:
    computer readable program code configured to receive an input from a first user requesting information, wherein a response to the input requires performance of an action external to a dialog window;

computer readable program code configured to generate a conversation model from a dialog that occurs between the user and a human agent while the human agent is responding to the input;

computer readable program code configured to record actions of the human agent performing the external action required to respond to the input;

computer readable program code configured to map steps performed during performance of the external action to conversation slots within the dialog, wherein the mapping comprises (i) identifying information requested by the human agent during the dialog and (ii) determining an input step within the external action where the information is provided;

computer readable program code configured to generate, from (i) the conversational model, (ii) recorded external action, and (iii) mapped steps, an integrated interpretable conversation model comprising a dialog and action script;

computer readable program code configured to receive, at a conversational agent system, a subsequent input from a second user requesting similar information to the information requested by the first user; and computer readable program code configured to provide, by the conversational agent system, a response to the subsequent input, wherein the providing a response comprises the conversational agent system utilizing the integrated interpretable conversational model to replay (i) the dialog and (ii) the action script using the subsequent input.

12. A computer program product, comprising:

a non-transitory computer readable storage medium having computer readable program code embodied therewith, the computer readable program code executable by a processor and comprising:

computer readable program code configured to receive an input from a first user requesting information, wherein a response to the input requires performance of an action external to a dialog window;

computer readable program code configured to generate a conversation model from a dialog that occurs between the user and a human agent while the human agent is responding to the input;

computer readable program code configured to record actions of the human agent performing the external action required to respond to the input;

computer readable program code configured to map steps performed during performance of the external action to conversation slots within the dialog, wherein the mapping comprises (i) identifying information requested by the human agent during the dialog and (ii) determining an input step within the external action where the information is provided;

computer readable program code configured to generate, from (i) the conversational model, (ii) recorded external action, and (iii) mapped steps, an integrated interpretable conversation model comprising a dialog and action script;

computer readable program code configured to receive, at a conversational agent system, a subsequent input from a second user requesting similar information to the information requested by the first user; and computer readable program code configured to provide, by the conversational agent system, a response to the subsequent input, wherein the providing a response comprises the conversational agent system utilizing the integrated interpretable conversational model to replay (i) the dialog and (ii) the action script using the subsequent input.

13. The computer program product of claim 12, wherein the generating a conversation model comprises identifying an intent of the dialog; and wherein the receiving a subsequent input comprises identifying that the subsequent input has the same intent as the identified intent of the dialog.

14. The computer program product of claim 12, wherein the providing a response comprises the conversational agent system prompting the second user based upon the conversation slots of the dialog.

15. The computer program product of claim 12, comprising parameterizing the recorded external action based upon inputs provided during the external action to generate the action script; and wherein the replaying the action script comprises dynamically changing the parameters using inputs provided during the subsequent dialog.

16. The computer program product of claim 12, comprising repairing the integrated interpretable conversational model during a dialog corresponding to the subsequent input after identifying an input error while executing the integrated interpretable conversational model; and wherein the repairing comprises (i) determining an external action step resulting in the error and a dialog input corresponding to the external action step and (ii) requesting the second user provide a corrected input based upon the determined dialog input.

17. The computer program product of claim 12, comprising repairing the integrated interpretable conversational model during a dialog corresponding to the subsequent input after identifying an assumption error while executing the integrated interpretable conversational model; and wherein the repairing comprises adjusting a mapping between a dialog input and a step of the external action.

18. The computer program product of claim 12, comprising repairing the integrated interpretable conversational model during a dialog corresponding to the subsequent input after identifying an ambiguity in input provided by the second user during the dialog; and wherein the repairing comprises executing steps of the external action using alternative inputs of the dialog, wherein the alternative inputs of the dialog are based upon the ambiguity.

19. The computer program product of claim 12, wherein the recording comprises recording at least one action selected from the group consisting of: an opened application, an opened window, and a provided input.

20. A method, comprising:

receiving, at a conversational agent system, an input from a user requesting information, wherein a response to the input requires performance of an action external to a dialog window of the conversational agent system;

identifying, at the conversational agent system, a response to the input, wherein the identifying comprises:

identifying, from a plurality of conversation logs, a conversation model that corresponds to the input, wherein the conversation model comprises a previously recorded dialog that corresponds to a similar previously provided input requesting the information;

the conversation model identifying an external action performed by an agent during provision of a response to the input, wherein the external action is recorded in a script;

the conversation model comprising mappings of inputs provided during the previously recorded dialog and a step within the script where each input is provided during performance of the external action; and returning a response to the input by (i) replaying the identified conversation model using the input and dialog inputs provided by the user during a replay of the identified conversation model and (ii) replaying the script corresponding to the conversation model to perform the external action using the input and dialog input; and providing, from the conversational agent system, the response to the user.

* * * * *